(12) United States Patent  (10) Patent No.: US 8,214,415 B2
Pearce et al.  (45) Date of Patent: Jul. 3, 2012

(54) INTERPOLATOR FOR A NETWORKED MOTION CONTROL SYSTEM

(75) Inventors: Robert Pearce, Bristol (GB); George Borkey Yundt, Andover, MA (US)

(73) Assignee: Motion Engineering Incorporated, Santa Barbara, CA (US)

( * ) Notice: Subject to any disclaimer, the term of this patent is extended or adjusted under 35 U.S.C. 154(b) by 1109 days.

(21) Appl. No.: 12/105,942

(22) Filed: Apr. 18, 2008

(65) Prior Publication Data

US 2009/0261771 A1  Oct. 22, 2009

(51) Int. Cl.
*G06F 17/17* (2006.01)
(52) U.S. Cl. .......................................... 708/313
(58) Field of Classification Search ................ None
See application file for complete search history.

(56) References Cited

U.S. PATENT DOCUMENTS

| | | |
|---|---|---|
| 4,214,192 A | 7/1980 | Bromer et al. |
| 4,276,792 A | 7/1981 | Strobel |
| 4,508,953 A | 4/1985 | Murakami et al. |
| 4,521,721 A | 6/1985 | Kinoshita |
| 4,538,233 A | 8/1985 | Resnick et al. |
| 4,550,383 A | 10/1985 | Sugimoto |
| 4,648,024 A | 3/1987 | Kato et al. |
| 4,683,543 A | 7/1987 | Hirasawa et al. |
| 4,689,543 A | 8/1987 | Hucker |
| 4,706,204 A | 11/1987 | Hattori |
| 4,803,640 A | 2/1989 | Mitomi et al. |
| 4,829,219 A | 5/1989 | Penkar |
| 4,833,381 A | 5/1989 | Taft et al. |
| 4,836,742 A | 6/1989 | Ishiguro et al. |
| 4,864,508 A | 9/1989 | Iwagaya |
| 4,879,663 A | 11/1989 | Fuehrer |
| 4,908,556 A | 3/1990 | Daggett et al. |
| 4,952,772 A | 8/1990 | Zana |
| 5,028,855 A | 7/1991 | Distler et al. |
| 5,030,819 A | 7/1991 | Borsari |
| 5,229,698 A | 7/1993 | Minnich et al. |
| 5,394,323 A | 2/1995 | Yellowley et al. |
| 5,438,522 A | 8/1995 | Crovella |
| 5,467,003 A | 11/1995 | Kosaka et al. |
| 5,493,193 A | 2/1996 | Seki et al. |
| 5,508,596 A | 4/1996 | Olsen |
| 5,825,654 A | 10/1998 | Speth et al. |
| 5,832,188 A | 11/1998 | Papiernik |
| 5,988,850 A | 11/1999 | Kumiya |
| 6,023,645 A | 2/2000 | Harima et al. |
| 6,054,830 A | 4/2000 | Tsujikado et al. |
| 6,163,124 A | 12/2000 | Ito et al. |

(Continued)

OTHER PUBLICATIONS

Can in Automation E.V., CiA Draft Standard Proposal 402, CANopen Device Profile Drives and Motion Control, Version 2.0, pp. 1-199, Jul. 26, 2002, Germany.

(Continued)

*Primary Examiner* — David H Malzahn
(74) *Attorney, Agent, or Firm* — Enrique J. Mora; Beusse Wolter Sanks Mora + Marie, P.A.

(57) ABSTRACT

An interpolator for a system, such as a motion control system, where a stream of values of at least a first command signal is communicated across a communications medium according to a predefined update rate. The integrator is configured to calculate at a higher rate relative to the update rate to generate at least one interpolated prediction of the first command signal.

31 Claims, 11 Drawing Sheets

U.S. PATENT DOCUMENTS

| | | |
|---|---|---|
| 6,401,006 B1 | 6/2002 | Mizuno et al. |
| 6,452,355 B2 | 9/2002 | Forster et al. |
| 6,463,358 B1 | 10/2002 | Watanabe et al. |
| 6,611,122 B2 | 8/2003 | Grohmann et al. |
| 6,677,721 B2 | 1/2004 | Grohmann et al. |
| 6,757,583 B2 | 6/2004 | Giamona et al. |
| 6,975,406 B2 * | 12/2005 | Demarest ............... 356/500 |
| 7,024,257 B2 | 4/2006 | Pearce et al. |
| 7,042,185 B2 | 5/2006 | Yang et al. |
| 7,143,301 B2 | 11/2006 | Pearce et al. |
| 7,167,772 B2 | 1/2007 | Hioki et al. |
| 2010/0091624 A1 * | 4/2010 | Honma ............... 369/47.48 |

OTHER PUBLICATIONS

ECODRIVE03 Drive for General Automation With Fieldbus-Interface, Chapters 8 & 9, ECODRIVE 03 FGP-03VRS, pp. 1-179, Copyright © 2000 Rexroth Indramat GmbH, Lohr, Germany.

\* cited by examiner

INTERPOLATOR FOR A NETWORKED MOTION CONTROL SYSTEM

BACKGROUND OF THE INVENTION

A motion control system is a means of controlling the position of at least one axis in an automated machine or plant. Example applications may be machine tools, robots, packaging machines, tape slitting machines, printing machines and pick-and-place machines.

It is known to communicate motion command values from a trajectory generator to one or more servo controllers by means of a serial network. Serial motion control networks have been implemented using either networks specifically designed for this purpose or using general purpose networks.

A practical consequence of using a serial network is that the motion control system acquires the characteristics of a sampled-data system.

Networked motion control systems have many advantages and have been widely adopted. However, they are not without some practical issues. For example, it would be desirable to eliminate or reduce rough motion that may be caused by infrequent updates of position and/or velocity command by computing intermediate, interpolated command values. It would be desirable for such an interpolation to be carried out using circuitry and/or techniques applicable to any number of axes and along any path of motion, yet using circuitry and/or techniques that do not rely on complex circuitry and/or complex numerical techniques, such as fitting polynomials. It would also be desirable to ease or eliminate synchronicity constraints dictated by a network update rate and the hierarchy of position, velocity and torque loops. It is also desirable to be able to reliably handle momentary interruptions in network communication, and safely perform motion-halting operations that may be needed in the event of system malfunctions, such as ramping down to a zero velocity. Accordingly, it is desirable to provide improvements to a networked motion control system.

DETAILED DESCRIPTION OF THE INVENTION

Figure 1:
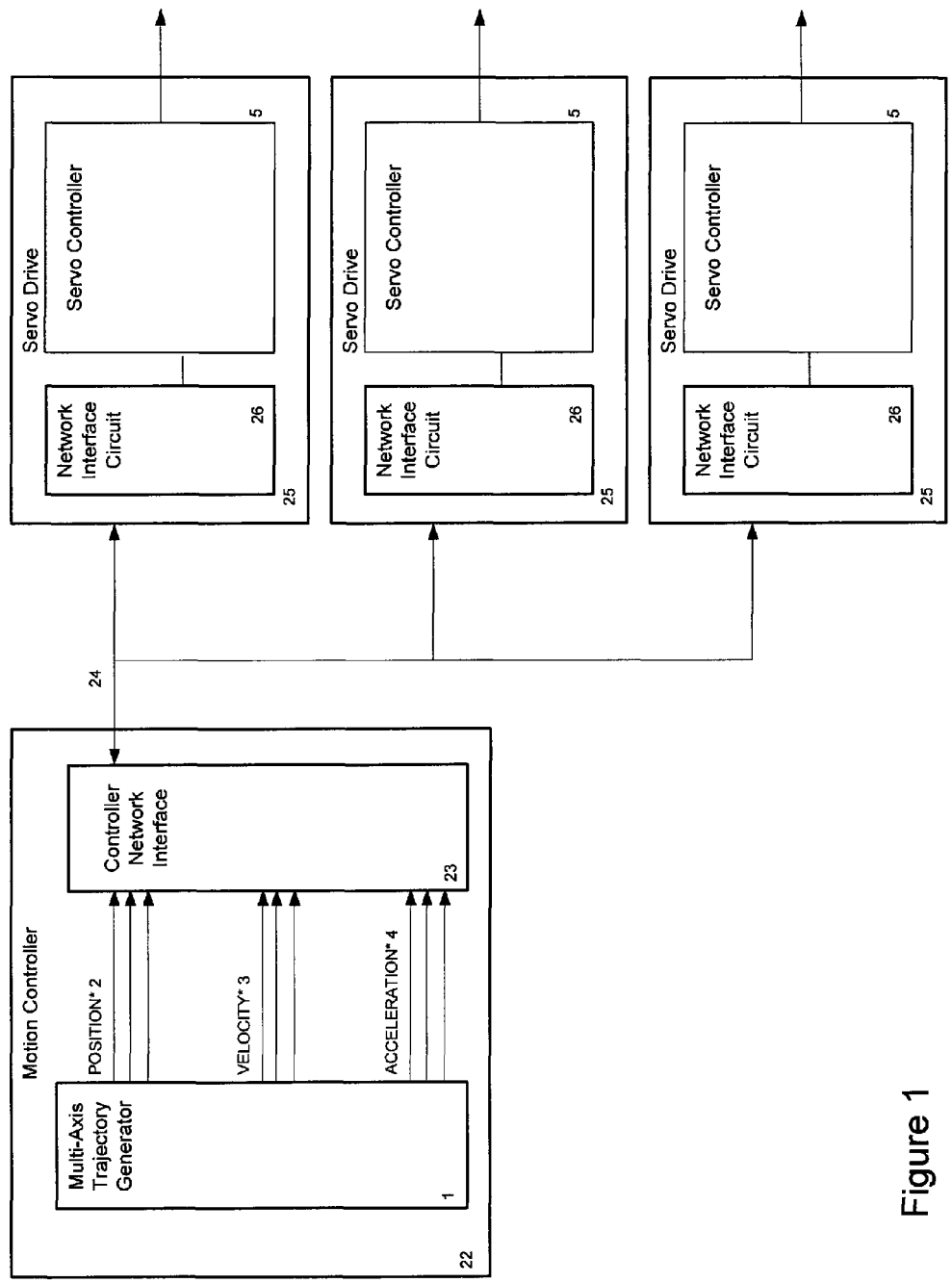
FIG. 1 is a block diagram representation of a generic networked, multi-axis motion control system that may benefit from aspects of the present invention.

FIG. 1 is a block diagram representation of an example of a generic networked motion control system (e.g., a three axes motion control system) as may benefit from aspects of the present invention. A trajectory generator 1 simultaneously computes respective values for a position command signal vector 2, a velocity command signal vector 3 and an acceleration command signal vector 4. The command signals from trajectory generator may be communicated to respective servo controllers 5 by through a serial network 24. Consistent with terminology familiar to one skilled in the art, the combination of trajectory generator 1 and a controller network interface 23 is here referred to as a motion controller 22. Similarly, the combination of a network interface circuitry 26 with a respective servo controller 5 is referred to as a servo drive 25. Each servo drive is configured to regulate electrical current (or currents in the case of an AC electromotive machine) to produce torque at the shaft of a respective machine (not shown). A practical system will entail read-back of run-time information from the servo controllers for configuration, monitoring and/or control purposes and, accordingly, the flow of signals across network 24 is bi-directional. Each servo controller 5 is typically operated as a cascaded control structure, with respective control loops to, for example, regulate torque, velocity and position.

A practical consequence of using a serial network to connect motion controller 22 to servo drives 25 is that the motion control system acquires the characteristics of a digitally-sampled data system. In order to achieve predictable system behavior, the position, velocity and acceleration demands should be applied simultaneously (or at least with predictable timing) to all axes. This in turn implies that the position, velocity and acceleration demands should be transmitted across the network according to a periodic, repeating timetable. Similarly, the return data to the motion controller should also conform to a periodic, repeating timetable, at least where that data is used for closed-loop control purposes.

Figure 2:
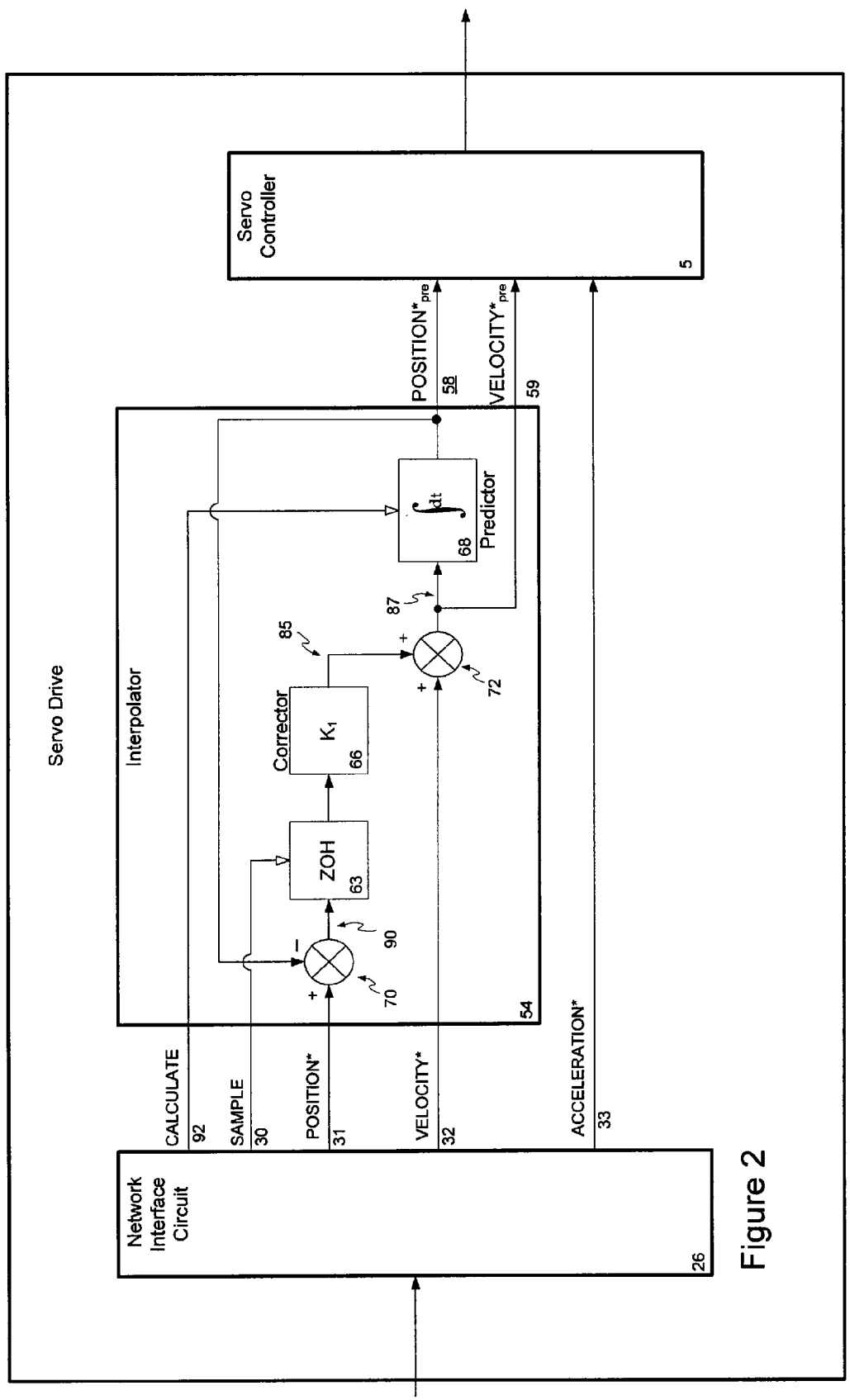
FIG. 2 is a block diagram representation of a servo drive incorporating an example first order interpolator embodying aspects of the present invention.

FIG. 2 is a block diagram representation of an example embodiment of a servo drive as may be used in a networked motion control system embodying aspects of the present invention. FIG. 2 shows an interpolator 54 interconnected between network interface circuit 26 and a servo controller 5. FIG. 2 shows respective position 31 and velocity 32 command signals from the network interface circuit 26 that are inputs to interpolator 54, which supplies a predicted position command signal 58 and a predicted velocity command signal 59 to the servo controller 5. An acceleration command signal 33 may be supplied directly from the network interface circuit 26 to the servo controller 5. It will be appreciated that a control architecture that uses an acceleration feed-forward signal and/or a velocity feed-forward signal is optional.

In one example embodiment, interpolator 54 may operate as follows: a periodic SAMPLE signal 30 is indicative of when an updated set of values of command signals (31, 32, 33) has been received from the network. The command signals (31, 32, 33) retain their respective present values between updates supplied by the network. The SAMPLE signal 30 causes a zero-order hold circuit 63 to update its output.

A periodic CALCULATE signal 92 causes a predictor 68 to carry out a computational operation. The CALCULATE signal 92 may be selected to have a predefined higher frequency than the SAMPLE signal 30. For the sake of one example description of operation, let the CALCULATE signal be phase-aligned to the SAMPLE signal and be a harmonic of the SAMPLE signal, as may be accomplished using a phase-locked loop or, in the alternative, by a plurality of cascaded timers.

The description of an example operation of interpolator 54 continues as follows: A signal output 85 from a corrector 66 may initially have a zero value, and predictor 68 may compute the value of predicted position command signal 58 by integrating the commanded velocity 32 with respect to time. This computation may be configured to occur more frequently than the periodic update of the commanded velocity 32 supplied by the network. Consequently, predicted position command values 58 are available to servo controller 5 more frequently than, and change in smaller steps than, position command values 31 received via the network interface circuit 26.

To address the practical problems of rounding error and other transient sources of error, the predicted position command signal 58 may be corrected using a closed-loop control. In one example embodiment, this correction may be performed by subtracting in a subtractor 70 the predicted position command signal 58 from the position command signal 31 and retaining a resulting position error signal 90 between network updates using zero order hold 63. Corrector 66 may then amplify error signal 90 to generate a velocity correction signal 85, which is added in a summer 72 to the velocity command signal 32 to produce the predicted velocity command signal 87, which corresponds to the predicted velocity command 59 supplied to the servo controller. Because of the presence of zero-order hold 63, subsequent changes in the values of signals 90 and 85 occur whenever a new set of command values (31, 32, 33) is available, as indicated by SAMPLE signal 30, and thus, in a practical embodiment, there is no requirement to compute these signals more frequently. Changes in the position command signal 31 will generally have a stepped representation because command signal 31 is updated periodically by the network. However, zero order hold 63 ensures that corrector 66 does not attempt to force the predicted position command signal 58 to track the steps in command signal 31.

Despite its simplicity, a basic first-order interpolator as described in the context of FIG. 2, is of considerable practical benefit. Consider an example system where the motion controller is communicating at a cyclical rate of 500 Hz via the network with a servo drive that has loop closure rates of 32 kHz, 8 kHz and 2 kHz for torque, velocity and position loops respectively. In this example, the interpolator will perform its calculations at a rate of 2 kHz. Moreover, although the network update rate is as low as 500 Hz, values for the predicted position command signal 58 in the servo drive can be computed by the predictor at the same rate as the position loop itself, namely 2 kHz, and therefore a relatively smooth motion can be obtained.

An estimation operation that may be performed during a network outage is called "spanning" and this term will be used hereafter to distinguish this operation from cyclical interpolation configured to improve smoothness and/or improve system accuracy in connection with following commands.

It will be appreciated that interpolator 54 can provide a spanning operation: For example, in the event that a data packet or succession of data packets, carrying the commanded values of position, velocity and acceleration is missing or corrupted, then the command signals 31, 32, 33 from the network interface circuit will retain their respective state from the last valid command data packet and the SAMPLE signal 30 will not be activated; under these conditions, signals 85, 32, 87 and 59 will remain unchanged. However, the predicted position command signal 58 will continue to be updated by predictor 68. Once the network interruption has ceased, SAMPLE signal 30 will be activated each instance a new command packet is received by the network and new command values for signals 31, 32 will be presented to interpolator 54. At this time, a disparity in value may arise between the predicted position command signal 58 and the position command signal 31 received from the network. In this case, the output signal 85 of corrector 66 will adjust the predicted velocity command 59 to gradually, e.g., over several cycles of interpolation, force the disparity to essentially a zero value at a rate determined by corrector 66. Accordingly, not only does interpolator 54 fulfill a spanning operation but it also commands any correcting motion that may be required—without requiring intervention from the motion controller or servo controller 5. It will be appreciated by one skilled in the art that the foregoing aspects constitute a substantial advantage and simplification over the prior art.

It is noted that a first-order interpolator, as described in the context of FIG. 2, can exhibit the following two characteristics. Firstly, a first-order interpolator generally operates (e.g., spans) most effectively if the commanded velocity is constant over the period when the interpolator carries out the spanning, as the predicted position command 58 will exactly match the position command 31 that would have been received from the network. However, when there is commanded acceleration present during the spanning, then a disparity can arise between the values of the predicted position command signal 58 and the position command signal 31. Secondly, although the predicted position command signal 58 is interpolated as described above, changes in the predicted velocity command signal 59 occur just when the input signals 30, 31, 32 to the interpolator are updated by the network; i.e., the velocity command signal 59 is not interpolated.

Consider an example system where signals 30, 31, 32 are updated at 500 Hz, with a servo drive that has loop closure rates of 32 kHz, 8 kHz and 2 kHz for the torque, velocity and position loops respectively. The interpolator performs its calculations at a rate of 2 kHz to compute a new value for the predicted position command signal 58 but the predicted velocity command signal 59 is updated at only 500 Hz, which is within the typical velocity loop bandwidth of 1 kHz and, consequently, a velocity feed-forward can coarsen the motion—particularly when the commanded velocity is changing rapidly.

Figure 3:
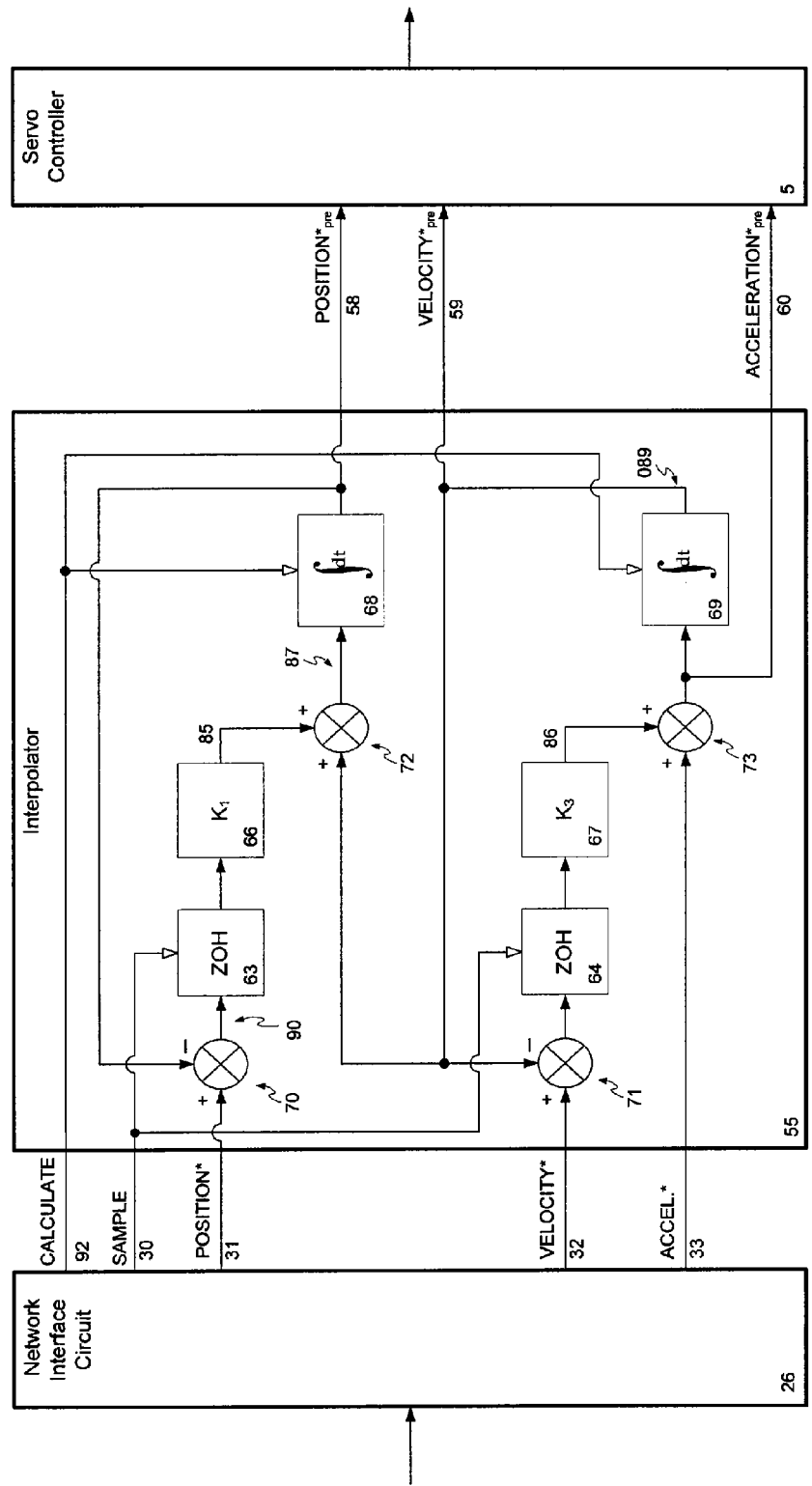
FIG. 3 is a block diagram representation of a servo drive incorporating an example second order interpolator embodying aspects of the present invention.

Both of these characteristics can be reduced or avoided in a given application by using a second order interpolator as shown in FIG. 3. Again feed-forward control is optional and an acceleration feed-forward signal is shown in FIG. 3 for the sake of illustrating such an option. FIG. 3 illustrates an interpolator 55 that includes a second predictor 69 which uses acceleration command signal 33 to generate a predicted velocity command signal 89. The structure and thus the operation of this velocity command interpolator section (blocks 64, 67, 69, 73) is identical to that of the position command interpolator section (blocks 63, 66, 068, 72) explained above. In the second order interpolator of FIG. 3, the predicted velocity command signal 89 is used by the position interpolator section in place of the commanded velocity 32. Both predictors 68 and 69 and summer 72 calculate their outputs multiple times per network update, and thereby interpolate both the position and velocity command signals 58 and 59. Although it is realizable for these predictors to operate at different rates, for the sake of simplicity of explanation, let us presume that in one example embodiment both predictors 68 and 69 operate at 8 kHz under the control of the CALCULATE signal 092. Let us now consider an example operation of second order interpolator 55. The error correction signals 85 and 86 may initially be zero. The acceleration command signal 33 is integrated by predictor 69 to generate a velocity prediction signal 89, which is added in summer 72 to the velocity correction signal 85 to produce signal 87 which in turn is integrated by predictor 68 to produce the predicted position command 58. Whenever, as indicated by the SAMPLE signal 30, new command values for signals 31, 32, 33 are received, first and second correctors 66 and 67 will generate respective error correction signals 85 and 86 to correct errors.

In one example embodiment, both the predicted position and velocity command signals 58 and 59 are interpolated and both are computed at a predefined rate (e.g., 8 kHz) so that fresh, interpolated values are supplied to the servo controller at every execution of the position loop (e.g., 2 kHz) and at every execution of the velocity loop (e.g., 8 kHz). Changing the predicted velocity command signal 59 faster than the bandwidth of the velocity loop (e.g., 1 kHz) would ensure that velocity feed-forward is usable.

Figure 4:
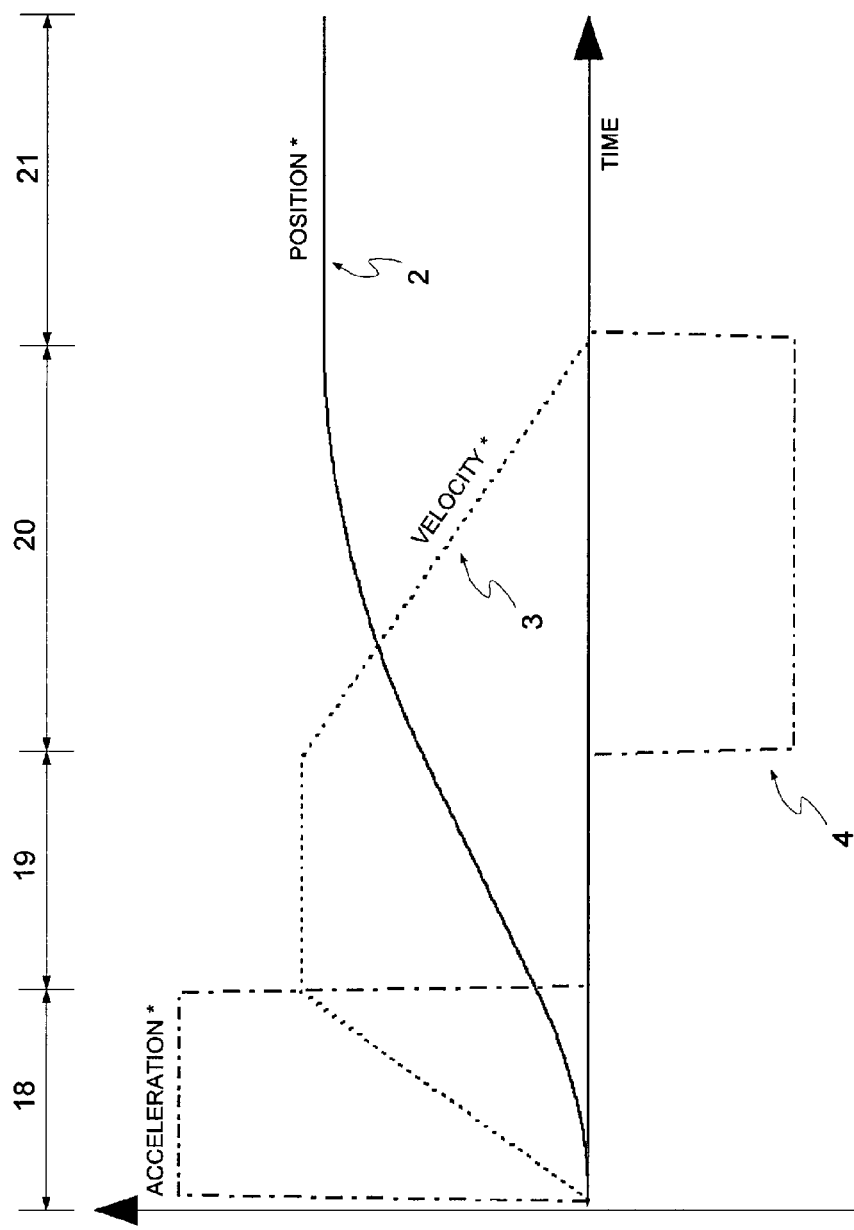
FIG. 4 illustrates respective plots of an example motion profile of commanded position, velocity and acceleration with respect to time.

Let us now consider the operation of the second order predictor during spanning. FIG. 4 shows an example motion profile where an acceleration signal 4 is a piece-wise constant signal. That is, there is a constant acceleration during a first time interval 18 of the motion profile. There is zero acceleration and therefore constant velocity 3 in a time interval 19 of the motion profile. There is a constant deceleration during a time interval 20 of the motion profile, followed by zero acceleration and velocity during an idle time interval 21.

In the event spanning occurs within any of these four time intervals 18, 19, 20, 21, then the second order interpolator 55 of FIG. 3 will continue to generate accurate predicted command signals 58, 59 and 60 because a received acceleration command value 4 will continue to be correct during a respective section of the motion profile. However, if spanning occurs during a transition between two consecutive sections of the motion profile, e.g. between time intervals 18 and 19 in FIG. 4, then a correcting movement will occur when the next valid command packet is received because the acceleration command signal 4 will have changed.

An additional benefit of using a second (or higher) order topology for the interpolator is that such a topology may be adapted to a motion sequence conducive to carry out a rapid ramping down of velocity to zero, such as may be required in situations when either the network or the motion controller has failed.

Figure 5:
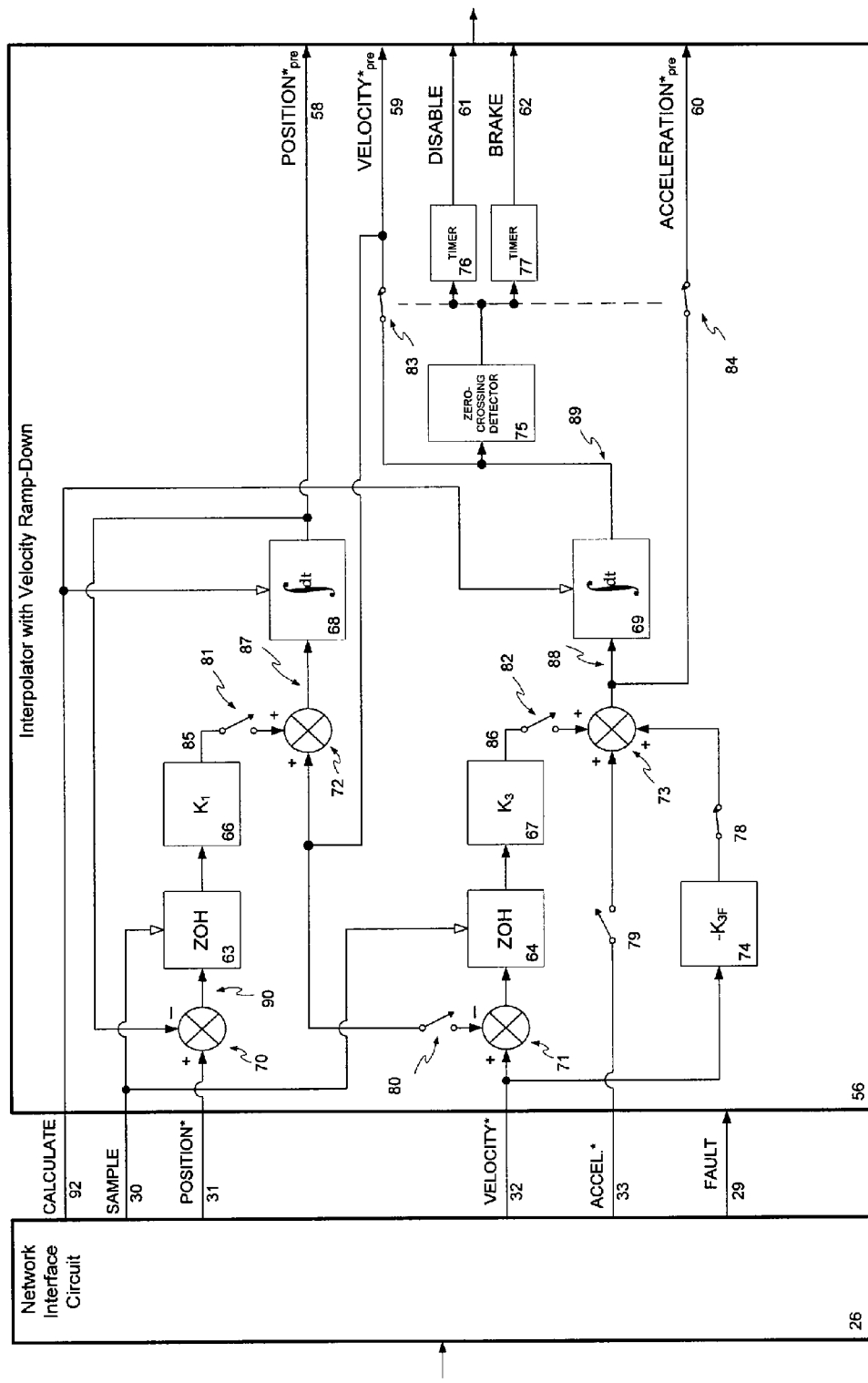
FIG. 5 is a block diagram representation of a servo drive incorporating an example second order interpolator with velocity ramp-down.

FIG. 5 shows an example embodiment of an interpolator adapted to implement a ramp-down operation conducive to a zero velocity. When the network interface circuit at the servo drive detects a fault condition, such as a loss and/or corruption of several in-bound data packets, it sets the FAULT signal 29 which causes (signal coupling not shown for the sake of clarity) switches 79, 80, 81, 82 to open (i.e., set its respective output signal to zero) and a switch 78 to close (i.e., pass through its respective input signal to its respective output). The velocity command signal 32 remains at the last value that was received and this signal is scaled and inverted by block 74 before being integrated by predictor 69. The predicted velocity command 89, and, consequently, the velocity command signal 59 would ramp towards zero and the predicted position command 58 takes on respective values consistent with ramping down to zero velocity. Predicted position signal 58 and predicted velocity signal 59 will respectively resemble profiles 2 and 3 respectively during time interval 20 of FIG. 4. When the predicted velocity command signal 59 ramps through zero, a zero crossing detector 75 may be configured to open switches 83 and 84 to set the predicted velocity command 59 and predicted acceleration command 60 to zero, and shortly afterwards, as may be controlled by timers 76 and 77, a brake signal 62 and a disable signal 61 may be applied. The duration of the ramp-down can be set by the scale factor in block 74. In one example embodiment, the scale factor may be set as follows:

$$K_{3F}=\text{(last value valid value of velocity command signal)/(time taken to ramp-down)}$$

The ability to ramp-down to zero velocity using interpolator 56 provides a distinct advantage over the prior art because it offers straightforward circuitry configured to implement an important function that can be shown to be free from sources of systematic error.

Let us now turn to practical considerations of how one could implement example interpolator 56 of FIG. 5, example interpolator 55 of FIG. 3 and example interpolator 54 of FIG. 2.

An example architecture of a servo drive is shown in FIG. 2 and comprises two main blocks: network interface circuit 26, which may be an Application-Specific Integrated Circuit (ASIC) or a Field Programmable Gate Array (FPGA) and servo controller 5 which generally comprises a processor (e.g., a microcontroller or a digital signal processor and may be hereafter referred to as "the processor"). Although a given circuitry for the interpolator could be interconnected between network interface circuit 26 and servo controller 5, for economic considerations, it may be desirable to incorporate the interpolator into either the network interface circuit 26 or, in the alternative, into the processor.

It is contemplated that an FPGA-based architecture for any one of example interpolators (54, 55, 56, or 57) could take various forms. One conceptually straightforward approach is to take each element of the interpolator and directly implement each internal block (e.g., switch, timer, summer, subtractor, multiplier, etc.) by a corresponding logic element. It will be appreciated that such an implementation would be capable of relatively high update rates, e.g., in the order of megahertz, but would require many gates—especially as position commands may require 64 bits and intermediate signals with still longer bit lengths may be required.

FPGAs are generally supplied with a plurality of block memories, such as dual-ported RAMs, that can offer a relatively efficient means of storing results of computations compared to registers, for example.

Figure 6:
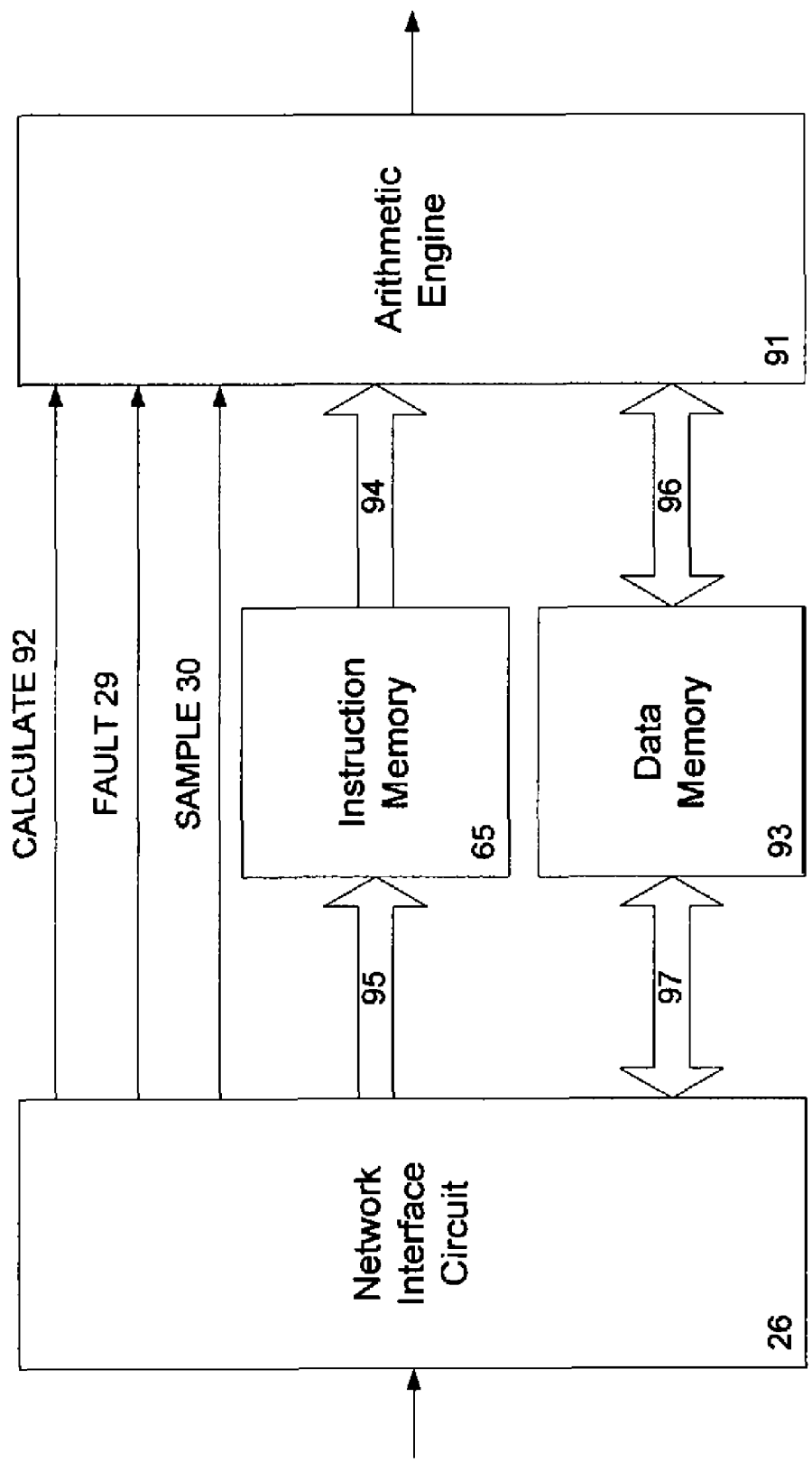
FIG. 6 is a block diagram representation of an FPGA-based interpolator architecture using an arithmetic engine.

Thus, one example architecture for economically implementing an interpolator embodying aspects of the present invention may be to configure a primitive arithmetic engine 91, as shown in FIG. 6, that can execute the various blocks, (e.g., switch, timer, summer, subtractor, multiplier, etc.) of the interpolator. The engine need just support the respective arithmetic operations required by any one of example interpolators (54, 55, 56 or 57), such as addition, subtraction, and multiplication, along with an ability to load and store results and a branching instruction to implement a switching functionality.

Referring to the example interpolator architecture of FIG. 6: an instruction memory 65 may be initially loaded with a sequence of instructions required for arithmetic engine 91 to implement interpolator operations. This loading process can occur either during an initial FPGA configuration, or network interface circuit 26 can load the instructions into memory 65 via a data bus 95, for example. Similarly, a data memory 93 may be initially loaded with the respective gain values for scaling blocks 66, 67, 74; the respective time-outs for timers 76, 77; and the respective initial conditions for integrators 68, 69. As noted above, this loading can occur either during an initial FPGA configuration or network interface circuit 26 can load the data into data memory 93 via bus 97. Loading via the network interface circuit 26 may have the advantage that the motion controller could set gains, time-outs and initial conditions according to the needs of a given application. When the configuration of the memories has been completed and the network is operational, the interpolation operation can start.

In operation, the input command signals of position, velocity and acceleration supplied by network interface circuit 26 may be loaded into data memory 93 via data bus 97 and, upon processing performed by arithmetic engine 91 and transfer via a data bus 96, output signals 58, 59, 60, 61, 62 may be fetched from memory 93 by network interface circuit 26 via data bus 97. Intermediate signals (e.g. signals 85, 86, 87, 89) that result from calculations may also be held in memory 93. It is contemplated that this type of implementation is conducive to efficient development and debugging. It would alternatively be possible to use a single memory for both data and instructions albeit with some increase in logic complexity and reduction in throughput.

One example cyclical sequence of operation of the interpolator implementation of FIG. 6 will now be described with reference to the timing diagram of FIG. 7. In this example embodiment, arithmetic engine 91 is responsive to network interface circuit 26 on a cyclical basis when CALCULATE signal 92 is activated. For example, arithmetic engine 91 may operate on new data when new input data has been received from the network and loaded into data memory 93 by the network interface circuit (as may be indicated to the arithmetic engine when SAMPLE signal 30 is TRUE). Conversely, arithmetic engine 91 may operate on old input data (as may be indicated when SAMPLE signal 30 is FALSE). Each computation operation, as may be indicated by the pulses in waveform 98, generates a set of interpolated values, which the network interface circuit subsequently reads from data memory 93, as may be indicated by the pulses in waveform 99. The arithmetic engine may be in an idle state until network interface circuit 26 triggers a computation operation by strobing (e.g., pulsing) CALCULATE signal 92. Fault signal 29 causes the arithmetic engine to drive the ramp to zero, starting at the next instant that the CALCULATE signal 92 is strobed. Generally, an FPGA may have one or more built-in, hardware multiplication blocks which can be dedicated for use by the arithmetic engine. However, not every FPGA has such multiplication blocks and even where such blocks are present they may not comprise an adequate number and/or size for a given application. It will be appreciated that building multipliers from logic elements is an alternative approach but this approach may require a large number of gates. Noting that arithmetic shifts are equivalent to multiplying by a power of two, in certain embodiments it may be desirable to implement the interpolator using an architecture based on shifters configured to perform arithmetic shifts. For example, shifters are generally more gate-efficient than multipliers. Such an architecture may be achieved by making two modifications to above-described example embodiments. For example, respective corrector gains 66, 67 and ramp-down rate 74 can be configured as powers of two with virtually no practical impact on the operation of the machine. Secondly, a suitable means should be provided to implement numerical integration blocks 49 and 69.

Figure 8:
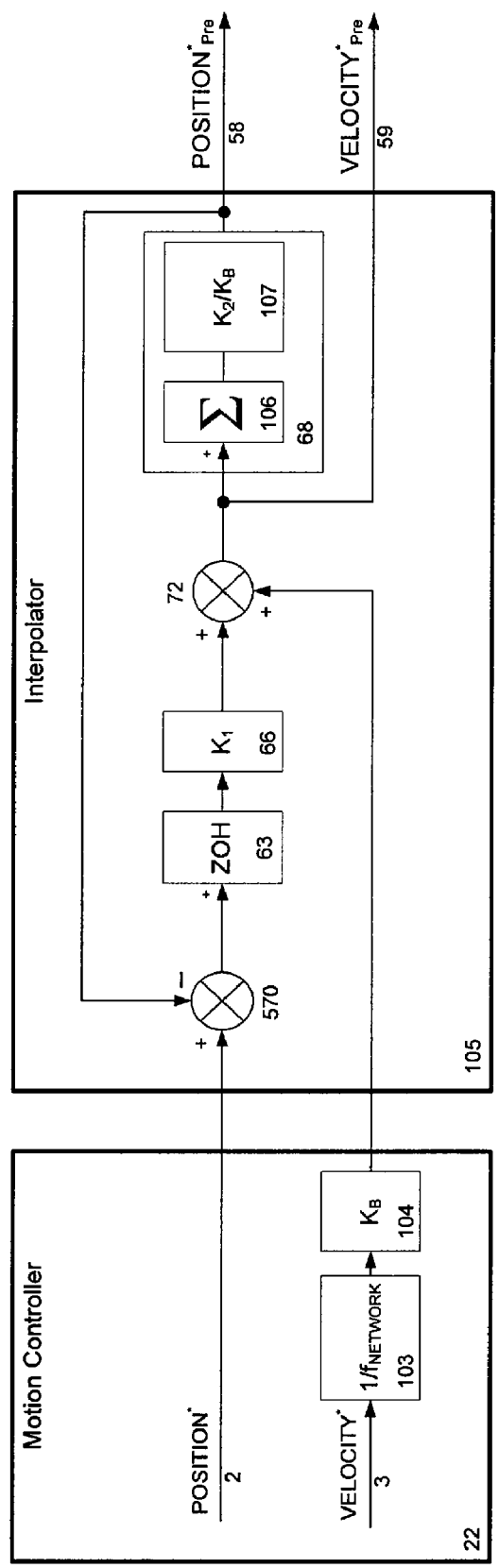
FIG. 8 is a block diagram representation of a time-discrete, first order interpolator architecture.

As will be appreciated by those skilled in the art, in discrete time systems, a numerical integration operation may be implemented by periodically summing and scaling the output of the summation by the respective time intervals between summations. FIG. 8 is a somewhat simplified block representation of a first-order interpolator, as described in the context of FIG. 2, wherein the term $K_2$ in a scaling block 107 represents a scale factor for converting the output of a summer 106 to represent an integration operation. $K_2$, in a general case, may not be a power of two. In a general case, the motion controller would first scale its velocity command signal to be in counts per network cycle and then it would scale this signal by a further factor, $K_B$. Generally, a motion controller will have sufficient arithmetic capability and moreover is generally required to perform this scaling just once per network update cycle. The purpose of scale factor $K_B$ is to ensure that a resultant scale factor from a quotient $K_2/K_B$ in block 107 is a power of two and this would allow arithmetic shifters to be used for the interpolator. It will be appreciated that this technique can applied to higher order interpolators.

Additional Alternative Example Embodiments

ASICs, especially structured ASICs, are similar to FPGAs and the foregoing description about implementing the interpolator either by directly mapping each function to gates or by using an arithmetic engine apply equally to an ASIC-based architecture. For example, it is alternatively contemplated to incorporate the functionality of the interpolator of FIG. 6 into the processor, presuming that servo controller 5 comprises a processor. This implementation is straightforward to accomplish, provided that there is sufficient spare processing throughput. Essentially each of the elements within blocks of example interpolators 54, 55, 56, or 57 could, for example, be incorporated into a software module configured to close the velocity loop. This will ensure that the update of the predicted command values occurs synchronously with the velocity loop which itself will be synchronous with the position loop. Correctors 66 and 67 need not be more complex than just multiplying by a constant. Predictors 68 and 69 constitute respective numerical integrators, which can be implemented by summing and then scaling by the integration interval (i.e. rectangular integration method).

It is further contemplated that example interpolators described in the context of FIG. 2, FIG. 3, FIG. 5, FIG. 6 (or higher order) could be realized using analogue electronic circuitry. For example, each summation element 70, 72, 71, 73 can be implemented using an operational amplifier (op-amp) arranged to add (or subtract) input signals; the zero-order holds 63, 64 can be implemented using respective sample-and-hold circuits; correctors 66, 67 can be implemented as op-amp non-inverting amplifier circuits; predictors 68, 69 can be implemented as non-inverting op-amp integrator circuits. It will be appreciated that equivalent circuit functions may be performed using switched-capacitor circuits.

It will be appreciated that in the example second-order interpolators 55 of FIG. 3 and 56 of FIG. 5, the velocity command signal 59 is equal to the output 89 of the velocity predictor 69, whereas it would alternatively be possible to use signal 87 as the source of the velocity command signal 59; the advantage of doing so is that the velocity command would incorporate corrections to the position during spanning but the disadvantage is that it would contain steps at the rate of the signal SAMPLE 30.

In operation the first and second order example interpolators described herein offer an effective means of generating intermediate position and, optionally, velocity targets to generate smooth motion and are equally effective at spanning in the event that command data packets are lost. Furthermore, relatively minor modifications to the second order position interpolator allow it to generate a controlled velocity ramp down to stop motion, or to a predefined velocity, in the event of a fault. The first and second order interpolators can be implemented either within an FPGA, or an ASIC and with or without multiplication blocks. A software implementation of the first or higher order interpolators is also possible.

It is noted that the example interpolator described in the context of FIG. 3 could be further adapted to be a third order interpolator, i.e., to integrate jerk (jerk is the time-derivative of acceleration) to predict acceleration, to integrate acceleration to predict velocity and to integrate velocity to predict position commands. This would result in a smooth predicted acceleration signal, which would be beneficial when used in a feed-forward control. Similarly, a third order interpolator could span more accurately during motion segments that have constant jerk. Interpolators of fourth and higher orders are also possible. In a general case, a system embodying aspects of the present invention may include a number (N) of cascaded interpolator stages configured to receive from the communications medium a series of N time-derivative signals of a first command signal, such as the $1^{st}$ order time-derivative signal of the first command signal, the $2^{nd}$ order time-derivative signal of the first command signal ... the $i^{th}$ order time-derivative signal of the first command signal ... the $N^{th}$ order time-derivative signal of the first command signal. The system would generate interpolated predictions for the first command signal and a series of (N-1) time-derivative signals of the first command signal, such as interpolation of the $1^{st}$ order time-derivative signal of the first command signal, as interpolation of the $2^{nd}$ order time-derivative signal of the first command signal ... interpolation of the $i^{th}$ order time-derivative signal of the first command signal ... as interpolation of the $(N-1)^{th}$ order time-derivative signal of the first command signal. The number N is a positive integer equal to or larger than the number two.

Figure 9:
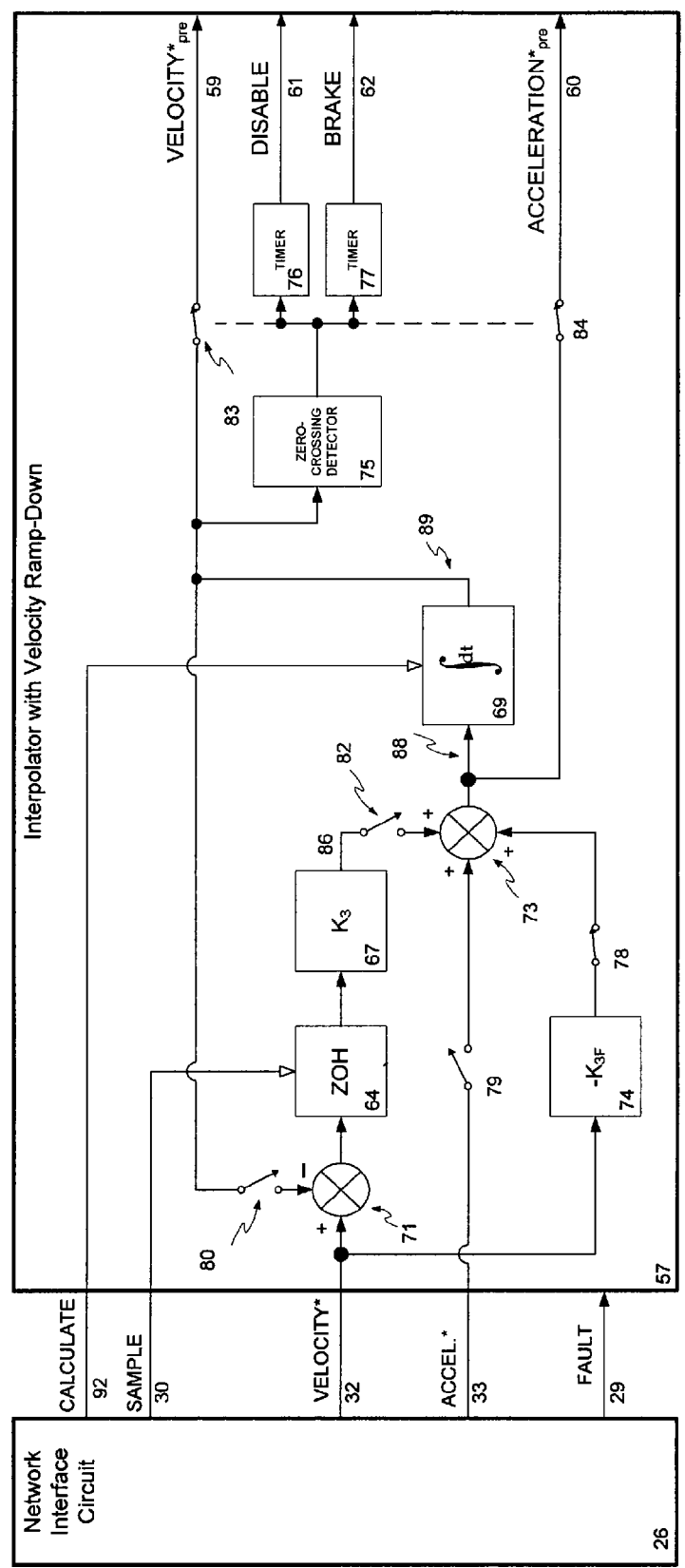
FIG. 9 is a block diagram representation of an example first order velocity interpolator with velocity ramp-down.

The example embodiment described in the context of FIG. 2 considers the interpolation of position, and the example embodiment described in the context of FIG. 3 considers the interpolation of position and velocity. It will be appreciated, however, that in some motion control systems, the servo drive(s) may be configured to close the torque and velocity loops and the motion controller may be configured to close the position loop. In this type of systems it may be desirable to interpolate the velocity command signal at the servo drive. This can be achieved using the example interpolator shown in FIG. 9. This is a simplification of the example interpolator of FIG. 5 and retains the "ramp-down to zero velocity in the event of a fault" feature. It will be appreciated that a velocity interpolator could be extended to a second or higher order. It will be appreciated that respective control laws implemented by correctors 66 and 67 can, if desired, be more sophisticated than the example plain gain shown. For example a proportional+integral+derivative control law could be implemented. The above-discussed embodiments consider the interpolation of command values in connection with servo drives. It will be appreciated, however, that example interpolators 54, 55 could be used in conjunction with stepper drives. One example technique of accomplishing this is to configure the interpolator to compute at a very high cyclical rate, e.g., in the order of 1 MHz, so that a pulse train can be generated by the lowest two bits of position command signal 58. This is feasible in an FPGA or ASIC implementation with a clock frequency in the order of 50 MHz. Then one would interface the interpolated position command value 58, which will be present in a multi-bit binary register, into a form that can be used by a stepper drive, such as a quadrature pulse train using a binary-to-quadrature converter circuit such as that illustrated in FIG. 10.

Figure 7:
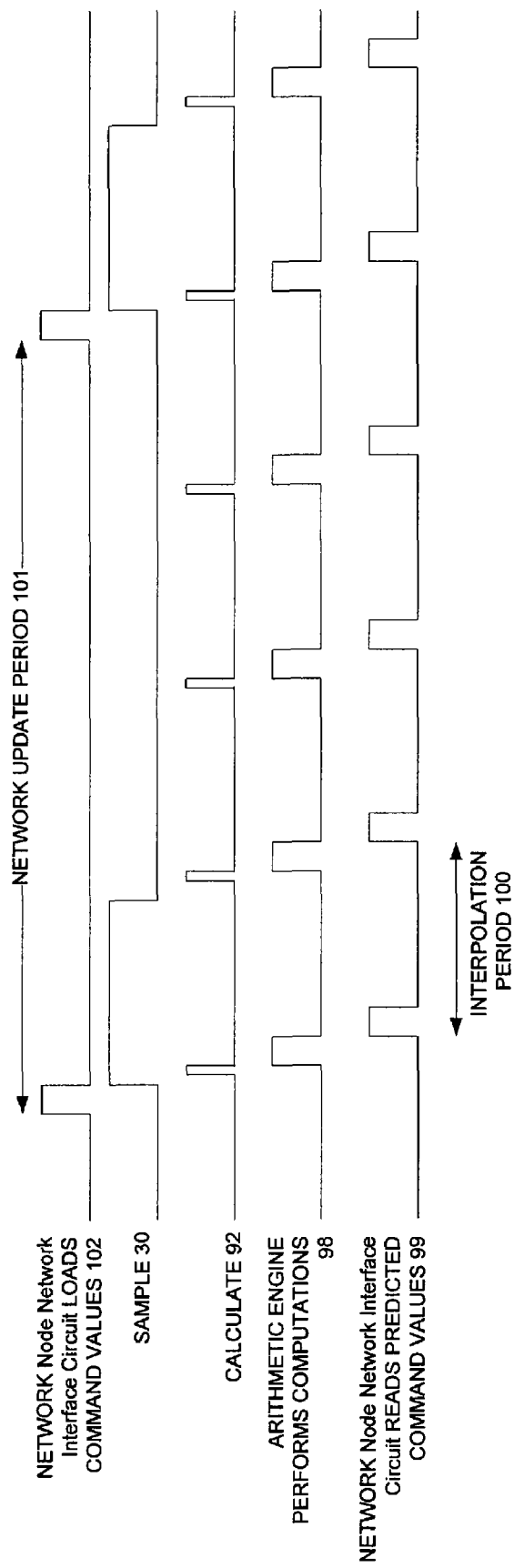
FIG. 7 is an example timing diagram for the interpolator of FIG. 6.

In the description of example embodiments that use either an FPGA or a software-based implementation, the interpolator has been operated at a rate which is synchronous with the update rates of the servo drive as depicted in FIG. 7. For example, if the position loop update rate is 2 kHz, the interpolator update rate should be a multiple of 2 kHz and it should be phase-aligned relative to the position loop. It will be appreciated that meeting this example criteria will work satisfactorily whereas, in contrast, if one were to operate the interpolator at a non-multiple update rate, (e.g., 15 kHz in this case) this could give rise to variable update delays and beating effects at lower frequencies—both of which would be undesirable.

It is noted that FPGA or ASIC based architectures for the main example embodiments are capable of interpolating much faster than 8 kHz and this leads to two additional useful ramifications. For example, if a motion control network has servo controllers with various update rates, such as 2 kHz, 3 kHz and 5 kHz, then the network update rate should be the lowest common denominator, which in this example case is 1 kHz (or sub-multiple thereof) so that the update rates of the servo controllers can be held in phase-alignment, so as to avoid variable downstream latencies. This criterion can be dispensed with if the interpolator in each servo drive is operated in this example case at 30 kHz (i.e. the product of 2×3×5 kHz) and each of the interpolators is held in phase alignment on the network. In this case each servo controller will be supplied with interpolated command values with a relatively short latency and the network update rate can be any integer divisor of 30 kHz.

A further variation is to run the interpolator at a very high rate, e.g., 500 kHz, in which case calculations performed by the interpolator need not be phase aligned with either the servo controller update rates or the network update rates as beating effects will be reduced to a negligible level and both the network update rate and the servo controller update rates can then be freely chosen.

Although aspects of the present invention have been described in the context of a networked motion control system and is of particular merit in such a system, it will be appreciated that the described interpolating apparatus and/or techniques may be applied to any system that utilizes a periodic communication of any quantity in combination with one or more time-derivatives of that quantity.

Figure 10:
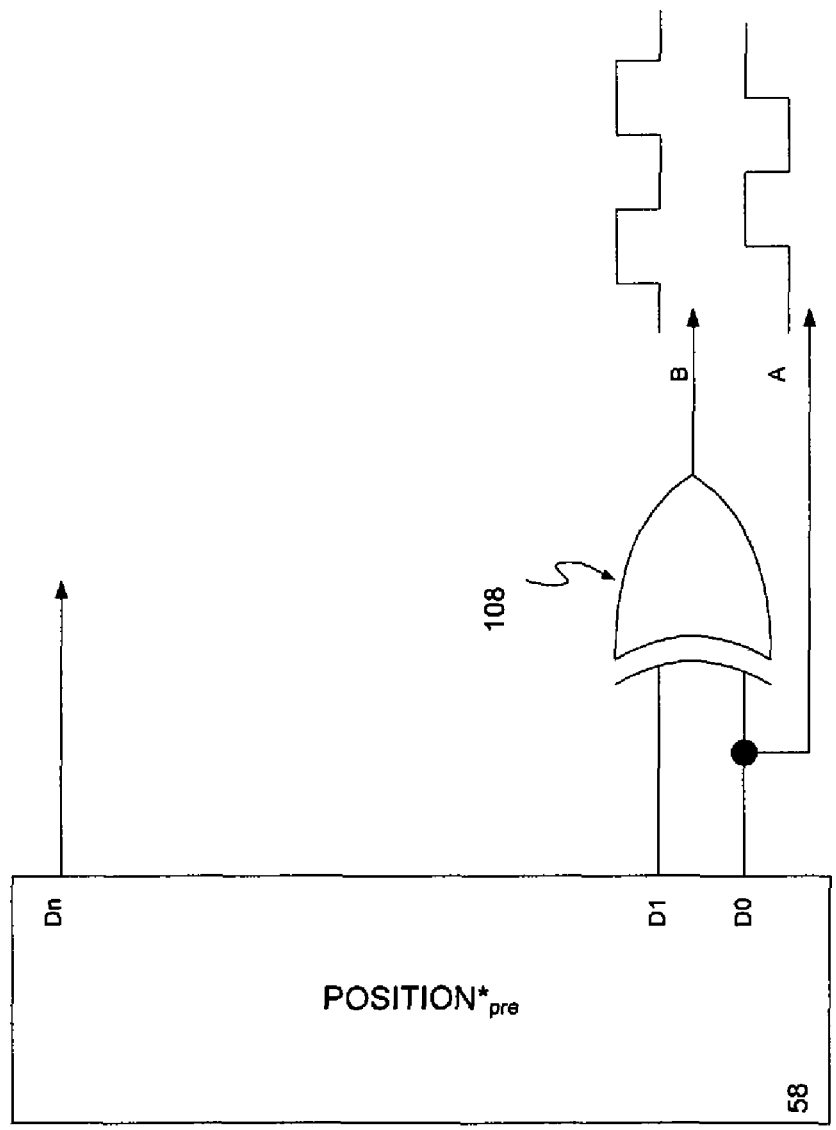
FIG. 10 is a block diagram representation of an example binary-to-quadrature converter circuit.
Figure 11:
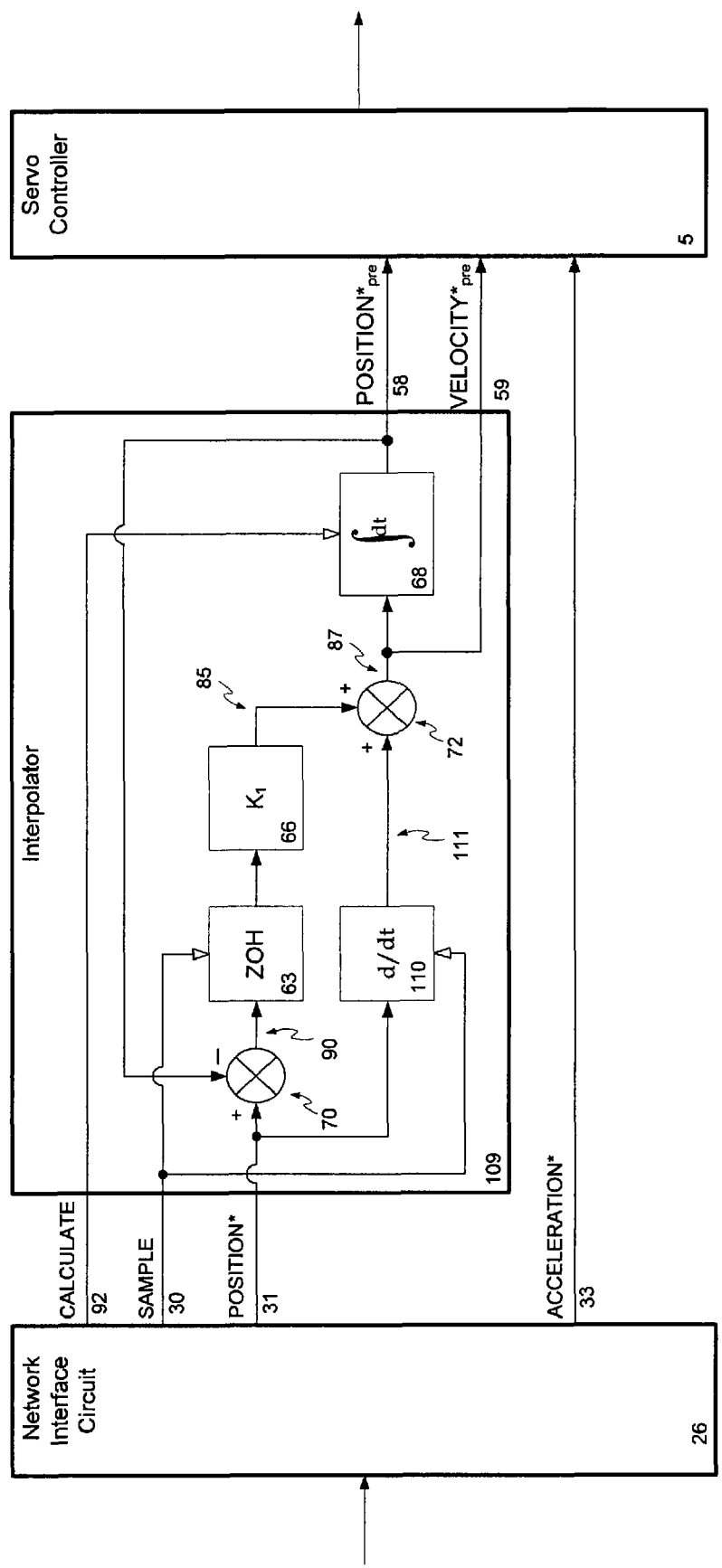
FIG. 11 is a block diagram representation of an example first order position interpolator not supplied with a velocity command.

An interpolator embodying aspects of the present invention can be adapted to allow operation when the derivative of the command signal is either unavailable, or has been omitted to conserve network bandwidth. For example in FIG. 11, a first order, position interpolator 109 is not supplied with a velocity command signal which instead is estimated by differentiating the position command signal 31 using a differentiation block 110. As will be understood by one skilled in the art, differentiation can be performed using standard numerical techniques, such as subtracting successive values and scaling the result by the time interval; therefore output signal 111 from differentiator 110 may be updated in synchronism with the SAMPLE signal 30 as shown in FIG. 11. Note, however, that the estimated velocity command signal 111 will lag the true value 32 generated by the trajectory generator and this lag will delay the interpolated position command. Similarly, the recovery of interpolator 109 after spanning will not be as seamless in comparison to example interpolator 55 in FIG. 2. This follows because in this case two network updates will be needed to update the velocity estimate. Thus, example interpolator 109 in FIG. 10 is more suited to applications where the network update rate is relatively high.

Thus in operation an interpolator embodying aspects of the present invention provides a means to create a more frequent and more smoothly changing set of interpolated position, velocity or acceleration command values at the servo drive than are supplied by the motion controller. Such an interpolator can continue to operate even during brief interruptions of data packets including command values via a network and that it will automatically correct the command values upon a resumption of network communication. Such an interpolator can be realized either in hardware or in software, and it can be adapted to causing an associated servo motor to ramp down to a standstill. Such an interpolator can be adapted for use with stepper motors. Such an interpolator can accurately interface a motion controller operating at one cyclic rate to a servo drive operating at the same or a different cyclic rate that may or may not be integrally related to that of the motion controller.

While the above description discusses various specificities, these should not be construed as limitations on the scope of the invention, but rather as exemplifications of the embodiment thereof. Accordingly, the scope of the invention should be determined not by the described example embodiments by the appended claims and their legal equivalents.

What is claimed is:

1. An interpolator in a system where a stream of respective values of at least a first command signal is communicated across a communications medium according to a predefined update rate, the interpolator comprising:
   a processing device comprising circuitry configured to implement a first interpolator stage, the first interpolator stage comprising:
      a first subtractor configured to subtract a predicted value of the first command signal from a corresponding value of the first command signal communicated across the communications medium;
      a first zero-order hold coupled to receive an output signal from the first subtractor, the first zero-order hold responsive to a sample signal indicative of when fresh values of the first command signal and a second command signal have been received from the communications medium, wherein the second command signal is a time derivative of the first command signal;
      a first corrector coupled to receive an output signal from the zero-order hold to generate a correction signal;
      a first adder configured to add the correction signal to a second signal received by the first adder to generate a corrected signal; and
      a first integrator coupled to receive the corrected signal, the integrator configured to calculate at a higher rate relative to the update rate to generate at least one interpolated prediction of the first command signal.

2. The interpolator of claim 1, wherein the second signal received by the first adder is the second command signal received from the communications medium.

3. The interpolator of claim 1, wherein the processing device further comprises circuitry configured to implement a second interpolation stage, which is coupled to the first interpolation stage, the second interpolator stage comprising:
   a second subtractor configured to subtract a predicted value of the second command signal from a corresponding value of the second command signal communicated across the communications medium;
   a second zero-order hold coupled to receive an output signal from the second subtractor, the second zero-order hold responsive to the sample signal;
   a second corrector coupled to receive an output signal from the second zero-order hold to generate a correction signal;
   a second adder configured to add the correction signal from the second corrector to a third command signal received from the communications medium to generate a corrected third command signal, wherein the third command signal is a time derivative of the second command signal; and
   a second integrator coupled to receive the corrected third command signal, the second integrator configured to calculate at a higher rate relative to the update rate to generate at least one interpolated prediction of the second command signal.

4. The interpolator of claim 3, wherein the second signal received by the first adder is the predicted value of the second command signal.

5. The interpolator of claim 3 wherein the system comprises a motion control system including at least one servo controller responsive to at least one of the predicted command signals, and the communications medium comprises a communications network, wherein the first command signal comprises a position command, the second command signal comprises a velocity command, and the third command signal comprises an acceleration command.

6. The interpolator of claim 5 wherein the first and second interpolation stages are configured so that respective interpolated predictions of the first and second command signals continue to be generated during a momentary interruption of communication over the network, wherein the interpolated predictions generated during the interruption converge at a predefined rate to respective command values received from the network when communication over the network is reestablished.

7. The interpolator of claim 5 further comprising a module, which in response to a fault indication, generates a signal adapted to drive the velocity command at a controlled rate to a predefined lower magnitude.

8. The interpolator of claim 7 wherein the predefined lower magnitude comprises a zero value, and said module includes a zero-crossings detector configured to set a predicted velocity command and a predicted acceleration command to respective zero values in response to a detection of a zero-crossing in the driven velocity command.

9. The interpolator of claim 5 coupled to a respective scaling module configured to externally impart a predefined scaling to at least the second command signal, said scaling configured so that multiplication operations implemented by the interpolator are based on arithmetic shifting.

10. The interpolator of claim 5 wherein a respective update rate for the interpolated prediction command signals is selected to be phase-aligned relative to the update rate of the command signals received from the network.

11. The interpolator of claim 5 wherein a respective update rate for the interpolated prediction command signals is selected to be sufficiently fast relative to the update rate of the command signals received from the network so that a phase-alignment between the update rate for the interpolated prediction command signals and the update rate of the command signals received from the network is dispensed with.

12. The interpolator of claim 5 wherein a respective update rate for the interpolated prediction command signals is selected to be an integer multiple of a servo controller rate within each servo controller of the motion control system.

13. The interpolator of claim 1, wherein the circuitry configured to implement the interpolator stage comprises an instruction memory loaded with a sequence of instructions to be processed by an arithmetic engine to generate said at least one interpolated prediction of the first command signal.

14. The interpolator of claim 1, wherein the circuitry configured to implement the interpolator stage comprises a plurality of gates coded to generate said at least one interpolated prediction of the first command signal.

15. The interpolator of claim 1 wherein the circuitry configured to implement the interpolator stage comprises a computer-readable medium loaded with a sequence of computer-readable instructions, which when loaded in a processor and executed by the processor, generates said at least one interpolated prediction of the first command signal.

16. The interpolator of claim 1 comprising a number (N) of cascaded interpolator stages configured to receive from the communications medium a series of N time-derivative signals of the first command signal, wherein interpolated predictions for the first command signal and a series of (N-1) time-derivative signals of the first command signal are generated, wherein the number N is a positive integer equal to or larger than the number two.

17. A networked motion control system where a stream of respective values of at least a first command signal is communicated across a communications network according to a predefined update rate, the system comprising:
a network interface circuit coupled to receive at least said first command signal from the network, the interface circuit configured to generate a sample signal indicative of when fresh values of the first command signal and a second command signal have been received from the communications network, wherein the second command signal is a time derivative of the first command signal;
a processing device comprising circuitry configured to implement at least a first interpolator stage coupled to the network interface circuit, the first interpolator stage comprising:
a first subtractor configured to subtract a predicted value of the first command signal from a corresponding value of the first command signal communicated across the communications medium;
a first zero-order hold coupled to receive an output signal from the first subtractor, the first zero-order hold responsive to the sample signal;
a first corrector coupled to receive an output signal from the zero-order hold to generate a correction signal;
a first adder configured to add the correction signal to a second signal received by the first adder to generate a corrected signal; and
a first integrator coupled to receive the corrected signal, the integrator configured to calculate at a higher rate relative to the update rate to generate at least one interpolated prediction of the first command signal.

18. The motion control system of claim 17, wherein the processing device further comprises circuitry configured to implement a second interpolation stage, which is coupled to the first interpolation stage, the second interpolator stage comprising:
a second subtractor configured to subtract a predicted value of the second command signal from a corresponding value of the second command signal communicated across the communications network;
a second zero-order hold coupled to receive an output signal from the second subtractor, the second zero-order hold responsive to the sample signal;
a second corrector coupled to receive an output signal from the second zero-order hold to generate a correction signal;
a second adder configured to add the correction signal from the second corrector to a third command signal received from the communications network to generate a corrected third command signal, wherein the third command signal is a time derivative of the second command signal; and
a second integrator coupled to receive the corrected third command signal, the second integrator configured to calculate at a higher rate relative to the update rate to generate at least one interpolated prediction of the second command signal, wherein the first command signal comprises a position command, the second command signal comprises a velocity command, and the third command signal comprises an acceleration command.

19. The motion control system of claim 18 wherein the first and second interpolation stages are configured so that respective interpolated predictions of the first and second command signals continue to be generated during a momentary interruption of communication over the network, wherein the interpolated predictions generated during the interruption converge at a predefined rate to respective command values received from the network when communication over the network is reestablished.

20. The motion control system of claim 18 further comprising a module, which in response to a fault indication, generates a signal adapted to drive the velocity command at a controlled rate to a predefined lower magnitude.

21. The motion control system of claim 20 wherein the predefined lower magnitude comprises a zero value, and said module includes a zero-crossings detector configured to set a predicted velocity command and a predicted acceleration command to respective zero values in response to a detection of a zero-crossing in the driven velocity command.

22. The interpolator of claim 18, wherein the second signal received by the first adder is the predicted value of the second command signal.

23. The motion control system of claim 17 wherein the circuitry configured to implement the interpolator stage comprises an instruction memory loaded with a sequence of instructions to be processed by an arithmetic engine to perform a plurality of arithmetic operations to generate said at least one interpolated prediction of the first command signal.

24. The motion control system of claim 17 wherein the circuitry configured to implement the interpolator stage comprises a plurality of gates coded to perform a plurality of arithmetic operations to generate said at least one interpolated prediction of the first command signal.

25. The motion control system of claim 17 wherein the circuitry configured to implement the interpolator stage comprises a computer-readable medium loaded with a sequence of computer-readable instructions, which when loaded in a processor and executed by the processor, performs a plurality of arithmetic operations to generate said at least one interpolated prediction of the first command signal.

26. The motion control system of claim 1 coupled to a respective scaling module configured to impart a predefined scaling to at least the second command signal, said scaling configured so that multiplication operations implemented by the interpolator are based on arithmetic shifting.

27. The motion control system of claim 17 wherein a respective update rate for the interpolated prediction command signals is selected to be phase-aligned relative to the update rate of the command signals received from the network.

28. The motion control system of claim 17 wherein a respective update rate for the interpolated prediction command signals is selected to be sufficiently fast relative to the update rate of the command signals received from the network so that a phase-alignment between the update rate for the interpolated prediction command signals and the update rate of the command signals received from the network is dispensed with.

29. The motion control system of claim 17 comprising a number of three cascaded interpolator stages configured to receive from the communications network a first, a second and a third time-derivative signals of the first command signal, wherein interpolated predictions for the first command signal and for the first and second time-derivative signals of the first command signal are generated, wherein the first command signal comprises a position command, and the first, second and third time-derivative signals of the first command signal respectively comprise a velocity command, an acceleration command and a jerk command.

30. The interpolator of claim 17, wherein the second signal received by the first adder is the second command signal received from the communications medium.

31. A networked motion control system where a stream of respective values of a first command signal is communicated across a communications network according to a predefined update rate, the system comprising:
- a network interface circuit coupled to receive said first command signal from the network, the interface circuit configured to generate a sample signal indicative of when fresh values of the first command signal have been received from the communications network, wherein a second command signal is a time derivative of the first command signal;
- a processing device comprising circuitry configured to implement at least a first interpolator stage coupled to the network interface circuit, the first interpolator stage comprising:
- a first subtractor configured to subtract a predicted value of the first command signal from a corresponding value of the first command signal communicated across the communications medium;
- a first zero-order hold coupled to receive an output signal from the first subtractor, the first zero-order hold responsive to the sample signal;
- a first corrector coupled to receive an output signal from the zero-order hold to generate a correction signal;
- a first adder configured to add the correction signal to a predicted value of the second command signal to generate a corrected signal;
- a first integrator coupled to receive the corrected signal, the integrator configured to calculate at a higher rate relative to the update rate to generate at least one interpolated prediction of the first command signal,
- wherein the processing device further comprises circuitry configured to implement a second interpolation stage, which is coupled to the first interpolation stage, the second interpolator stage comprising:
- a second subtractor configured to subtract the predicted value of the second command signal from a corresponding value of the second command signal;
- a second zero-order hold coupled to receive an output signal from the second subtractor, the second zero-order hold responsive to the sample signal;
- a second corrector coupled to receive an output signal from the second zero-order hold to generate a correction signal;
- a second adder configured to add the correction signal from the second corrector to a third command signal to generate a corrected third command signal, wherein the third command signal is a time derivative of the second command signal; and
- a second integrator coupled to receive the corrected third command signal, the second integrator configured to calculate at a higher rate relative to the update rate to generate at least one interpolated prediction of the second command signal, wherein the first command signal comprises a position command, the second command signal comprises a velocity command, and the third command signal comprises an acceleration command, wherein the second command signal and the third command signal are self-generated in the processing device a respective numerical differentiator therein.

* * * * *